Dec. 29, 1953  A. B. COLLINS  2,664,476
SHEAR COUPLING CONTROLLED ELECTRIC SWITCH
Filed May 7, 1952
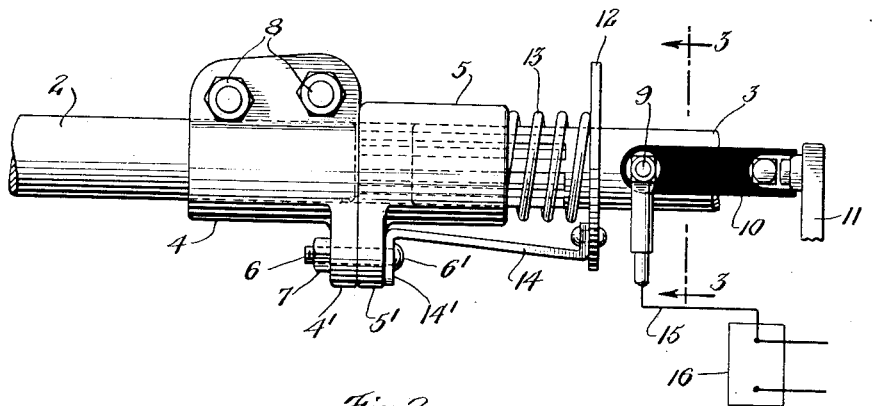
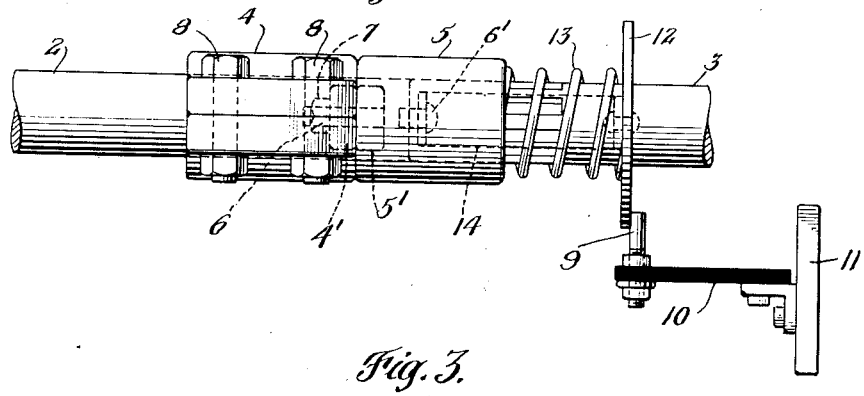
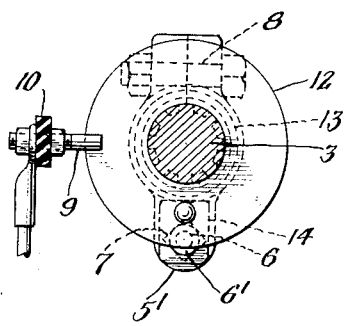
Inventor
Avery B. Collins
Richard E. Babcock Jr.
Attorney Patented Dec. 29, 1953

2,664,476

UNITED STATES PATENT OFFICE 2,664,476

SHEAR COUPLING CONTROLLED ELECTRIC SWITCH

Avery B. Collins, Kimberly, Idaho, assignor to The New Holland Machine Division of the Sperry Corporation, New Holland, Pa., a corporation of Delaware Application May 7, 1952, Serial No. 286,537

6 Claims. (Cl. 200—52)

This invention relates to a switch of the type which is automatically actuated in response to the shearing or rupturing of the shear element in a shear coupling such as may be employed between sections of a power transmitting shaft.

The invention finds particular utility in connection with such a shear coupling as employed in a twister shaft of a usual wire tie hay baler, though it is by no means limited to this particular use.

In such wire tie hay balers, it is customary to employ a shear coupling between sections of the drive link or shaft for the wire twister mechanism, to disconnect the drive to the twister mechanism and avoid damage thereto in the event of jamming of the twister. While this has served effectually to minimize damage to the twister mechanism, the baler operator often has been unaware of such disconnection of the twister, and has continued operation of the baler with the result that the baling wires have been considerably tangled and a number of untied bales formed, all of which have caused a considerable loss of time in order to remedy.

It is a primary object of the present invention to provide a switch for use with a shear coupling of the type in which the shear element or bolt extends parallel to the twister shaft sections and is utilized as an anchor element to normally maintain a movable switch contact in stationary position against the action of a resilient element constantly tending to cause operative movement thereof, the arrangement being such that shearing of the bolt or shear element will permit immediate operative movement of the movable contact. In accordance with the invention such a switch is arranged to wholly or partially short circuit the ignition system for the internal combustion motor which powers the baler, thus causing the motor either to stop completely or to run unevenly and thereby apprise the operator of the twister failure. Alternatively such a switch may be employed to control the circuit through a suitable electric indicator or signal device. In any event the operator is enabled to remedy the difficulty and place the twister back in operation before the baling wires become badly tangled.

It is a further object to provide such a switch mechanism which is adapted for use in conjunction with a power transmission shaft having relatively axially movable sections, without interfering with or being adversely affected by the axial movement between such sections.

It is a still further object to provide such a switch mechanism which comprises few and simple parts capable of application to existing shear couplings without necessitating any modification whatsoever of such shear couplings or their several component parts.

In the accompanying drawings:

Figure 1 represents a fragmentary elevation partly in diagram, illustrating my invention as applied to a shear coupling between the two aligned sections of the twister shaft, portions only of such sections being shown;

Figure 2 is a plan view of Figure 1 showing this shear pin severed and the contact ring engaging the fixed contact; and Figure 3 is a cross section taken on the line 3—3 of Figure 1.

Referring now in detail to the accompanying drawings, the twister drive shaft illustrated comprises a driving section 2 powered from the baler drive in any suitable manner, and a relatively axially aligned driven shaft section 3 which has a driven connection with shaft 2 through a shear pin coupling in which the coupling sleeves or elements 4 and 5, nonrotatably secured on the adjoining ends of shaft sections 2 and 3 respectively in abutting relation, are normally connected for rotation together by a conventional shear pin or bolt 6 which is slideably axially disposed through bores in radially projecting portions or arms 4', 5' respectively of the coupling elements. The shear bolt is secured against axial movement by endwise abutment of the bolt head 6' and nut 7 respectively against the said radially projecting portions 4', 5'.

Coupling member 4 is fixedly clamped around shaft section 2 by bolts 8—8, while the member or element 5 is splined on the end of its respective shaft section 3, as illustrated, for relative axial or telescoping movement, to thus permit such variation in the length of the twister shaft as may occur incident to operation of the twister mechanism.

The shear coupling thus far described is a conventional one, and constitutes no part of my present invention, except insofar as it is combined therewith, but is thus shown and described merely to facilitate a clear understanding of my invention.

The instant invention resides in the application to such a shear coupling of an electrical switch mechanism arranged for actuation in response to shearing of the bolt 6 to control an electrical circuit through any suitable electrical device or control mechanism, either to shut off the source of power for the baler, to energize a signal or both.

In the preferred embodiment of the invention, such a switch mechanism embodies a fixed contact 9 which is supported adjacent and to one side of the driven shaft section 3, and spaced axially from the coupling element 5. The supporting means for this contact may comprise a block or bracket 10 of insulating material carried by any suitable stationary element or portion 11 of the baler construction.

The movable switch contact 12 is preferably in the form of a ring of conductive material axially slideably encircling the drive shaft section 3 and in conductive engagement therewith.

Resilient means such as the helical spring 13 disposed coaxially on the shaft section 3 under compression between the coupling element 5 and the movable contact 12, constantly urges this movable contact toward its cooperating fixed contact 9, the latter being disposed in the path of movement of contact 12.

However, the movable contact 12 is connected to the shear pin or bolt 6, as by means of the bracket or connection 14, in a retracted position as in Figure 1, so as to be normally held by the shear pin or bolt 6 out of engagement with contact 9.

The connection or yoke 14 is riveted or otherwise permanently secured on the ring contact 12 in the preferred embodiment and extends therefrom axially of the shaft sections 2 and 3. Its free end 14' is outwardly bent and is apertured to slideably receive the shear bolt 6, the head 6' of which abuts against the outer face of the free end 14'. Since the nut 7 at the opposite end of the bolt 6 normally maintains the bolt against axial displacement, it will be seen that the bolt thus is connected to the movable contact 12 through the element 14 in such manner as to maintain the contact 12 retracted against the resilient pressure exerted by the spring 13.

Thus whenever the twister shaft is overloaded sufficiently to cause shearing or rupturing of the bolt 6, this will release the yoke or connection 14 and permit the spring 13 to immediately move the ring contact 12 into engagement with the fixed contact 9 to thereby close a circuit through said contacts, as indicated in Figure 2.

In the preferred usage of the invention in conjunction with a wire tie hay baler, a conductor 15 may be used to place the fixed contact 9 in circuit with the low voltage side of the ignition coil 16 for the internal combustion motor which operates the baler. Thus it will be seen that shearing of the bolt 6 and consequent interengagement of the switch contacts 12 and 9 will ground the ignition coil to the shaft section 3 and baler frame, thus shorting out the ignition system for the motor and thereby discontinuing its operation immediately.

Alternatively, the conductor 15 may be merely connected to one of the spark plugs of the baler motor to short out same upon shearing of the bolt 6 and thus render one of the cylinders of the motor inoperative to thereby apprise the baler operator of the fact that the twister is inoperative.

In this application, I have shown and described only the preferred embodiment of the invention simply by way of illustration of the practice thereof as by law required. However, I recognize that the invention is capable of other embodiments and that its several details may be modified in various ways or without departing from the invention. Accordingly the drawings and description herein are to be construed as merely illustrative in nature and not as exclusive.

Having thus described my invention, I claim:

1. A pair of axially aligned shafts respectively having coupling members rotatable therewith, one of said shafts being axially movable relative to its coupling member, a shear bolt disposed through said coupling members parallel to said shafts and connecting said coupling members and shafts for rotation together, in combination with a fixed contact and means supporting same adjacent said axially movable shaft, a ring contact encircling and movable axially on said movable shaft, spring means coiled coaxially about said movable shaft under compression between said ring contact and its adjacent coupling member and resiliently urging said ring contact axially toward said fixed contact, and a yoke connecting said ring contact to said shear bolt to normally retain said ring contact retracted out of engagement with said fixed contact.

2. A pair of axially aligned shafts respectively having coupling members rotatable therewith, a shear bolt disposed through said coupling members parallel to said shafts and connecting same for rotation together, in combination with a fixed contact and means supporting same adjacent said shafts, a ring contact encircling and movable axially on one of said shafts, spring means coiled coaxially about said last mentioned shaft under compression between said ring contact and one of said coupling members to resiliently urge said ring contact axially toward said fixed contact, and a yoke connecting said ring contact to said shear bolt to normally retain said ring contact out of engagement with said fixed contact.

3. In a shear coupling of the class in which coupling elements on the ends of relatively aligned shaft sections are connected for rotation together by means of a shear bolt extending parallel to said sections, the combination of a switch actuated responsive to the shearing of said bolt, said switch comprising a fixed contact and means supporting same adjacent said coupling elements, a movable ring contact encircling and axially slidable on one of said shaft sections into and out of engagement with said fixed contact, resilient means on said last mentioned shaft section urging said movable contact toward said fixed contact, a connection between the movable contact and said shear bolt normally maintaining the movable contact retracted from said fixed contact.

4. In a shear coupling of the class in which coupling elements on relatively aligned shaft sections are connected for rotation together by means of a shear bolt extending parallel to said sections, the combination of a switch actuated responsive to the shearing of said bolt, said switch comprising a fixed contact adjacent said coupling elements, a movable contact slidably supported on one of said shaft sections for operative movement relative to said fixed contact, resilient means constantly urging said moveable contact toward said fixed contact, a connection between the movable contact and said shear bolt normally preventing such operative movement.

5. In a shear coupling of the class in which a pair of coupling elements on relatively axially aligned rotary members are connected for rotation together by means of a shear bolt extending parallel to the axis of said members, one of said members comprising a shaft section, the combination of a switch actuated in response to the shearing of said bolt, said switch comprising a fixed contact adjacent said coupling elements, a movable contact slidably supported on one of said shaft sections for operative axial movement relative to said fixed contact, resilient means exerting axial force against said movable contact in a direction to cause operative movement thereof toward said fixed contact, a connection between the movable contact and said shear bolt normally preventing such movement.

6. In a shear coupling of the class in which axially aligned rotatable elements are connected for rotation together by means of a shear element extending parallel to the rotational axis of said rotatable elements, the combination of a switch actuated in response to the shearing of said shear element, said switch comprising a movable contact supported for axial movement relative to one of said rotatable elements and axially spaced from said shear element, resilient means urging said contact in an axial direction, a connection extending in an axial direction between the contact and said shear element normally preventing axial movement of said contact.

AVERY B. COLLINS.

References Cited in the file of this patent

UNITED STATES PATENTS

| Number | Name | Date |
|---|---|---|
| 1,520,000 | Baker et al. | Dec. 23, 1924 |